US009643540B2

(12) United States Patent
Puett

(10) Patent No.: US 9,643,540 B2
(45) Date of Patent: May 9, 2017

(54) SELF LEVELING/ADJUSTING APPARATUS TO PREVENT SPILLAGE OF BAGS IN THE STORAGE COMPARTMENT OF A VEHICLE

(71) Applicant: THE BAG RACK, LLC, Ashland, KY (US)

(72) Inventor: Kenneth Wayne Puett, Brandon, FL (US)

(73) Assignee: The Bag Rack, LLC, Ashland, KY (US)

( * ) Notice: Subject to any disclaimer, the term of this patent is extended or adjusted under 35 U.S.C. 154(b) by 0 days.

(21) Appl. No.: 14/601,746

(22) Filed: Jan. 21, 2015

(65) Prior Publication Data
US 2015/0321616 A1    Nov. 12, 2015

Related U.S. Application Data
(60) Provisional application No. 61/991,998, filed on May 12, 2014.

(51) Int. Cl.
*B60R 7/02* (2006.01)
*B60R 7/08* (2006.01)

(52) U.S. Cl.
CPC . *B60R 7/02* (2013.01); *B60R 7/08* (2013.01)

(58) Field of Classification Search
CPC ......... Y10S 224/925; B60R 7/02; B60R 7/08; B60R 2011/0036; B60R 5/04; B60R 7/10
USPC ..... 224/925, 572, 309, 313; 211/119, 181.1, 211/85.29, 113, 85.31, 12, 105.1, 106; 248/611, 95, 251, 340, 617, 317
See application file for complete search history.

(56) References Cited

U.S. PATENT DOCUMENTS

| | | | | |
|---|---|---|---|---|
| 1,520,839 A | * | 12/1924 | Muhlhausen | F21L 15/08 248/102 |
| 1,656,339 A | | 1/1928 | Runyan | |
| 2,292,270 A | * | 8/1942 | Hara | A47G 25/54 211/119 |
| 2,542,163 A | * | 2/1951 | Swalwell | B60R 7/10 211/123 |
| 2,554,483 A | * | 5/1951 | Corwin | A45C 13/03 206/285 |
| 2,644,589 A | * | 7/1953 | Levine | A47G 25/54 206/285 |
| 3,069,020 A | * | 12/1962 | Sans | A47B 61/04 211/162 |
| D201,735 S | * | 7/1965 | Reich | 223/85 |
| 3,329,385 A | * | 7/1967 | Dietsch | B60R 7/10 211/96 |
| 4,632,285 A | * | 12/1986 | Dillingham | A47G 25/74 223/88 |
| 5,103,985 A | * | 4/1992 | Davis | A47F 7/08 211/189 |
| 5,287,971 A | * | 2/1994 | Dorman | B60R 7/02 211/12 |

(Continued)

*Primary Examiner* — Nathan J Newhouse
*Assistant Examiner* — Scott McNurlen
(74) *Attorney, Agent, or Firm* — John S. Hale; Gipple & Hale

(57) ABSTRACT

A storage rack comprised of a support member having integral sinuous segments and open ends, with a plurality of support assemblies secured to the sinuous segments. Each support assembly has a hook member, an extension member secured to the book member and a loop member mounted to the extension member for mounting to a sinuous segment of the support member.

13 Claims, 4 Drawing Sheets

(56) References Cited

U.S. PATENT DOCUMENTS

| | | | | |
|---|---|---|---|---|
| 5,303,855 A | * | 4/1994 | Veale | A47G 25/18 |
| | | | | 223/85 |
| D353,291 S | * | 12/1994 | Mercer | D6/513 |
| 5,415,457 A | | 5/1995 | Kifer | |
| 5,975,599 A | * | 11/1999 | Goldstein | B60R 13/04 |
| | | | | 280/770 |
| 6,014,794 A | * | 1/2000 | Mc Coy | B62J 7/08 |
| | | | | 24/265 H |
| D505,273 S | * | 5/2005 | Miller | D6/317 |
| D626,712 S | | 11/2010 | Klein et al. | |
| 2004/0124222 A1 | * | 7/2004 | Richter | B60R 7/02 |
| | | | | 224/311 |
| 2006/0226303 A1 | * | 10/2006 | Weisenfeld | B60R 7/02 |
| | | | | 248/95 |
| 2009/0044812 A1 | * | 2/2009 | Welchel | A41D 13/1161 |
| | | | | 128/207.11 |
| 2012/0085799 A1 | * | 4/2012 | Castillo | B60R 7/10 |
| | | | | 224/309 |

* cited by examiner

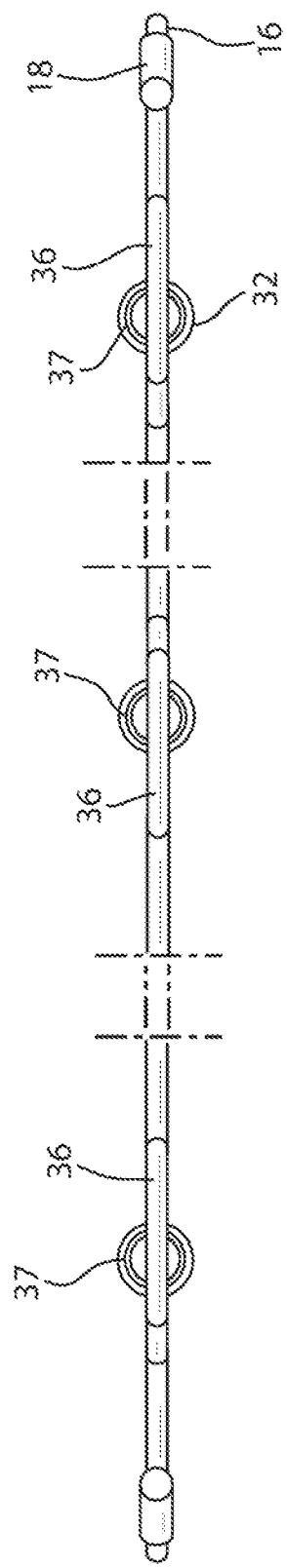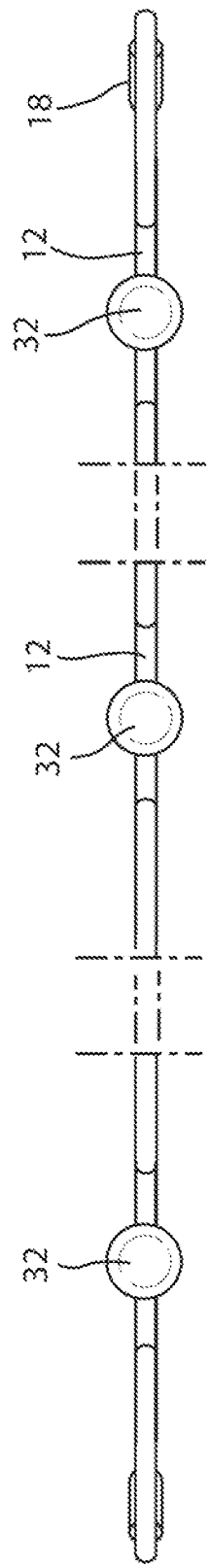
FIG. 2
FIG. 3

SELF LEVELING/ADJUSTING APPARATUS TO PREVENT SPILLAGE OF BAGS IN THE STORAGE COMPARTMENT OF A VEHICLE

RELATED APPLICATIONS

This is a utility application claiming benefit and priority from U.S. Provisional Application No. 61/991,998, filed May 12, 2014.

STATEMENT REGARDING FEDERAL SPONSORED RESEARCH OR DEVELOPMENT

None

REFERENCE TO SEQUENCE LISTING, A TABLE OR A COMPUTER PROGRAM LISTING COMPACT DISC APPENDIX

None.

BACKGROUND OF THE INVENTION

1. Field of Invention

The present invention relates to an apparatus which can be hung in a trunk compartment of a vehicle for holding shopping bags with looped handles or cut outs.

2. Background of the Invention

A problem associated with transporting articles in either the trunk area or rear storage area of a vehicle is that unrestrained articles may shift during transportation. If an article moves while being transported, it may be damaged or may impact another article potentially causing damage or breakage to that article.

Various restraining devices have been developed to hold objects while being transported in a trunk or rear storage area of a vehicle. One example of a restraining, device is a cargo net that may be secured to the hack of a vehicle seat, the floor of the trunk, or the floor of the rear storage area. Since cargo nets provide a way to secure loose articles within a storage area or trunk but are not popular with consumers because they are not convenient to use and may become tangled with themselves or with articles that are stored within the cargo nets. Another example of a restraining device used in vehicles such as sport utility vehicles or mini-vans is a bag hook that is fastened to an interior surface such as a seat back. Bag hooks are normally permanently fastened to the vehicle interior in set locations and cannot be adjusted to accommodate differently sized objects.

The prior art discloses a number of devices used to support bags and other articles in an automobile. U.S. Pat. No. 1,656,339 issued Jan. 17, 1928 discloses a receptacle which is suspended from a rail at the back of an automobile seat to provide a holder for various articles. The receptacle is provided with a number of hangers in the form of hooks which are fastened to the receptacle and hung from a rail secured to the hack of a car seat.

U.S. Pat. No. 5,415,457 issued May 16, 1995 discloses a supporting, attachment such as a plastic grocery bag assembly mounted on a vehicle seat bag with a row of spaced apart shopping bag mounting hooks formed on the outer side of the seat back with rows of mounting flanges extending through a seat back insert.

U.S. Design Pat. D626,712 issued Nov. 2, 2010 discloses a bag holder which is mounted to brackets which in turn are mounted over a seat.

SUMMARY OF THE INVENTION

The present invention is an apparatus is designed to hold bags with looped handles or open handle cut outs in the trunk compartment of a vehicle. The invention is made of a rigid wire support body formed in integral segments having an alternating U shaped pattern. The support body is supported by a plurality of individual support assemblies having elastic cords that provide a self leveling/adjusting height for the bags provided by the weight of the bags to rest on the floorboard inside the trunk compartment. The elastic cords are made with a hook secured at one end to fasten to one of a plurality of metal clips or hooks affixed to the rim of the trunk, compartment under the rubber weather stripping seal. The other end of the elastic cord is designed with an open loop or eyelet to be inserted over the wire support body at a plurality of different points, preferably three different spaced points so that the support body is level. Protective caps are placed on the ends of the wire support body to preclude tearing or cutting of the bags or injury to the person using the device.

One object of the invention is to provide an integral vehicle mounted assembly supporting, attachment for containers with handles thereon or cut out handles such as filled plastic shopping bags.

Another object of the invention is to provide a self leveling sinuous shaped member winch is mounted to the back of a trunk with support assemblies for supporting plastic containers such as plastic grocery bags.

The invention will be better understood and objects other than those set forth above will become apparent when consideration is given to the following detailed description thereof. Such description makes reference to the annexed drawings wherein.

BRIEF DESCRIPTION OF THE DRAWINGS

FIG. 2 is a top plan view of the storage rack shown in FIG. 1 with portions of the rack broken away;

FIG. 3 is a bottom plan view of the storage rack shown in FIG. 2;

These and other objects, advantages, and novel features of the present invention will become apparent when considered with the teachings contained in the detailed disclosure along with the accompanying drawings.

DESCRIPTION OF THE INVENTION

The best mode and preferred embodiment of the present invention is shown in FIGS. 1 through 6. While the invention is described in connection with certain preferred embodiments, it is not intended that the present invention be so limited. On the contrary, it is intended to cover all alternatives, modifications, and equivalent arrangements as may be included within the spirit and scope of the invention as defined by the appended claims.

Figure 1:
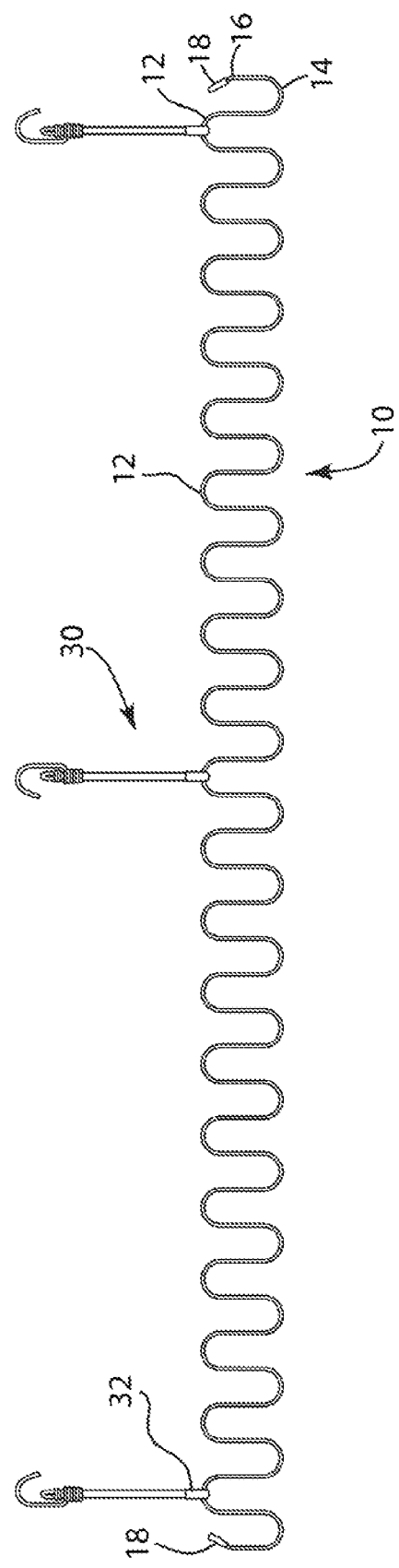
FIG. 1 is a side elevational view of the storage rack invention.
Figure 4:
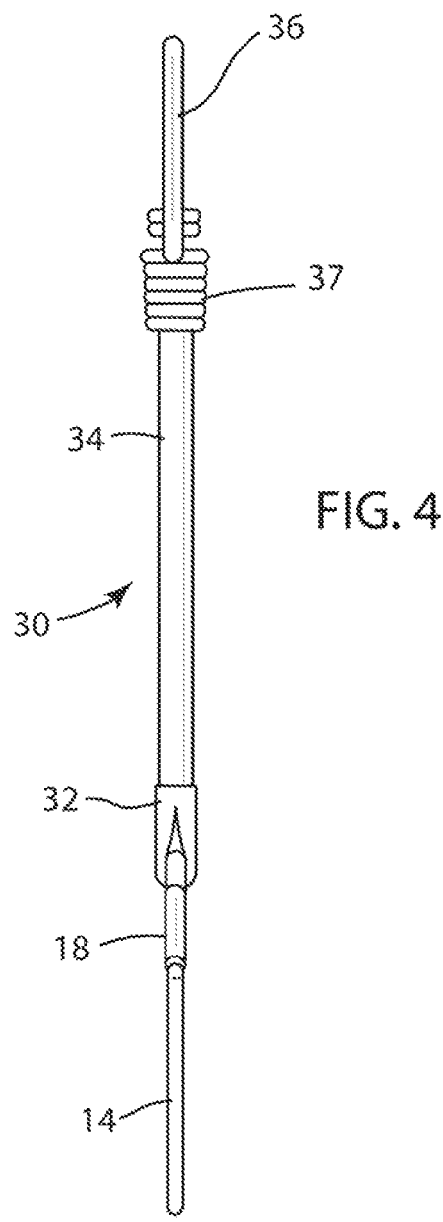
FIG. 4 is an enlarged front rear elevational view of the mounting assembly shown in FIG. 1.
Figure 5:
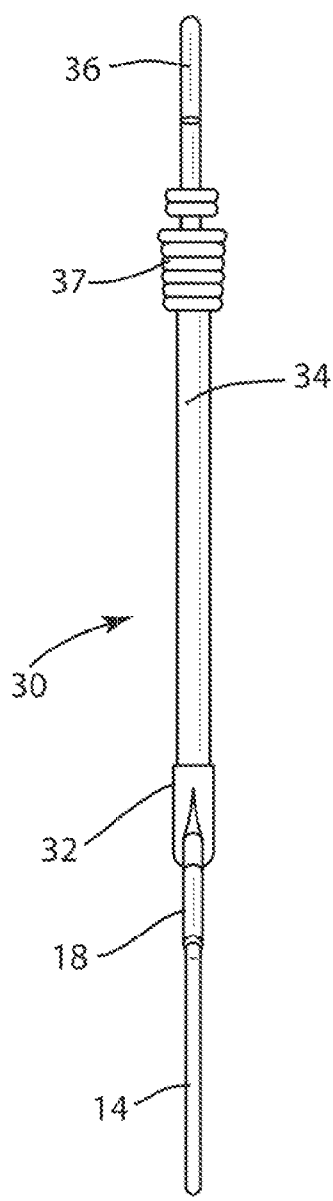
FIG. 5 is an enlarged front elevational view of mounting assembly shown in FIG. 4.
Figure 5A:
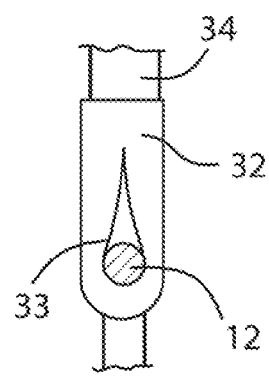
FIG. 5A is a 90° rotated view of the isolated eyelet of the mounting assembly shown in FIG. 5.
Figure 6:
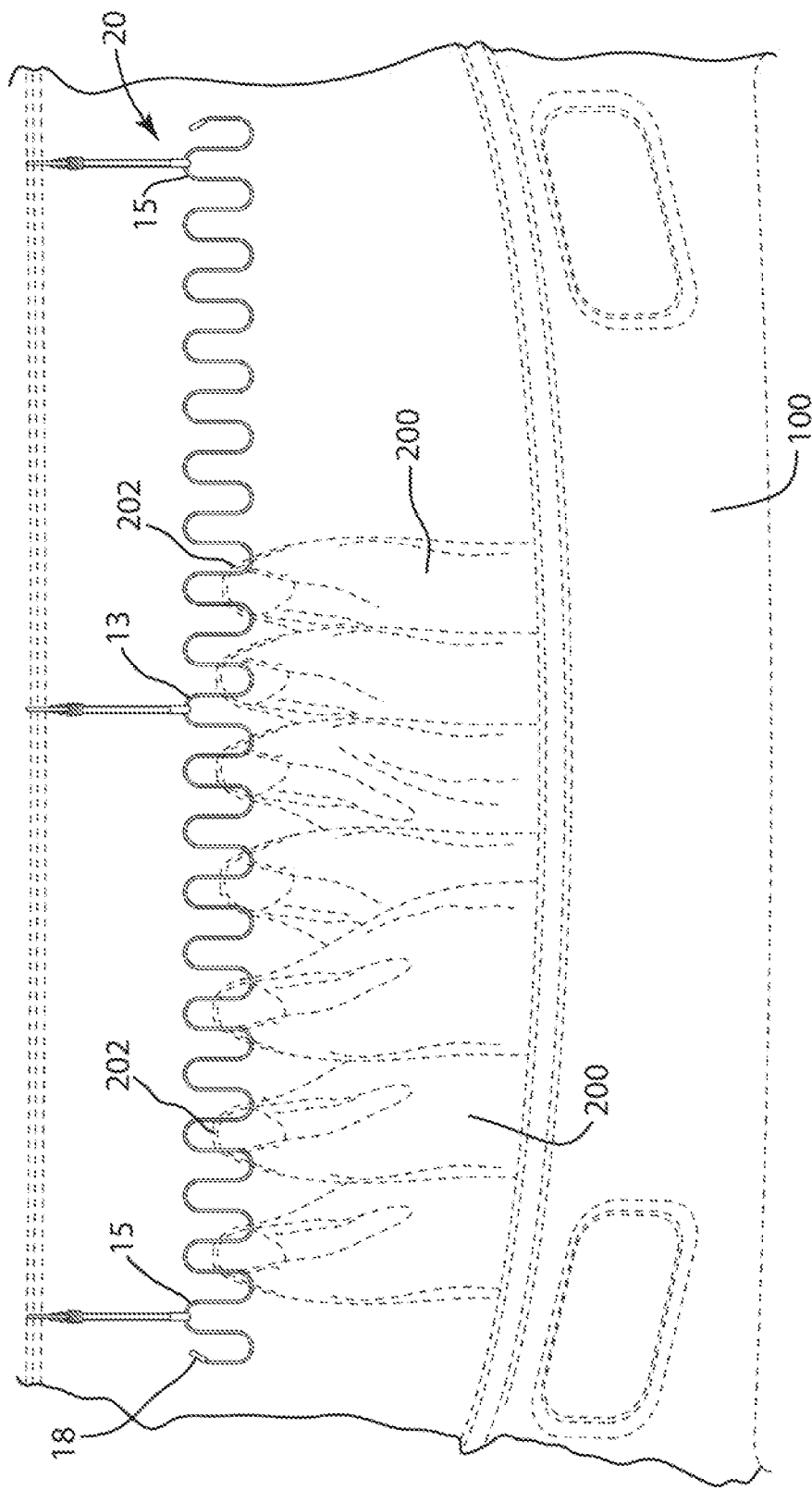
FIG. 6 is a side elevational view of the storage rack shown in FIG. 1 mounted in the trunk, of an automobile.

The invention is a sinuous or serpentine formed rigid support member 10 with a circular cross section preferably made of wire formed in integral alternating portions or segments 12 closed at one in a curve and open at the opposite end. The support member 10 has an open end 14 at each end with a tip 16 angled inward toward the adjacent alternating segment 12. The angled tip 16 is covered with a plastic end cap 18 to prevent the end of the tip from cutting or scraping the user or surrounding surfaces. The sinuous support member 10 can be constructed of metal such as steel or aluminum or constructed of plastic and is utilized as a bag storage rack 20 as shown in FIG. 6. The sinuous support member 10 has a plurality of mounting assemblies 30 mounted to the apex of the spaced alternating segments 12 at the ends and middle of the support member 10 which are used to support and mount the sinuous member to a roof, ledge or lip of a car trunk of a vehicle such as an automobile 100 so that the same forms a rack which can be used to support grocery or merchandise bags 200 as shown in phantom in FIG. 6 and prevent the contents of same from being spilled. As seen in FIG. 6, the handle 202 on the cut out of the bag 200 is looped over the projection of segment 12 to support the bag.

Each mounting assembly 30 has an end eyelet or loop 32 mounted or secured to an end of spun fabric, rubber, or spring, or elastic extension member 34 and a hook member 36 with a coiled spring base 37 mounted to the opposite end of the extension member 34 via a spring fastener 37. The hook member 36 can be open or formed with a moveable closure section which allows the hook member to be mounted or snapped to the ledge or lip 102 of the trunk of the automobile through a mounted clip.

The making of the rack apparatus 20 consists of cutting the sinuous support member 10 to a desired length ranging from about 32 inches to 36 inches, preferably about 34 inches ensuring that an odd number of U shaped and inverted U shaped segments 12 make up the length which has a serpentine appearance. Three support mounting assemblies 30 constructed, of elastic cords 34 provided with a hook member 36 at one end are used to mount the hook member to metal clips affixed to the automobile trunk rim or the top of the trunk or directly to the trunk. The elastic cords 34 will attach to the support member 10 at three points (the middle inverted U shaped segment 13 and the two outer most inverted U shaped segments 15 [see FIG. 6]), by sliding the support member assembly eyelet 32 formed with an eye 33 having a width or diameter greater than the diameter of the support member 10 to the previously prescribed locations on the respective segments 13 and 15 of the support member 10. The sinuous or serpentine segments 12 are preferably of an unequal number resulting in a middle segment 13 and two end segments 15. Each segment 12 is preferably 2 inches in length. Standard metal clips are alternatively attached to the trunk's rim 102 by lifting the trunks weather stripping seal and placing the slotted portion of the clip onto the rim and then securing the weather stripping seal back over the clip and the rim of the trunk. The metal clips need to be spaced to align with the corresponding hook attachment points where the elastic cord has been placed. The hooks 36 on the elastic cords 34 are then connected to the clips through a bottom opening formed on the clips. The protective caps 18 are mounted on the ends of the sinuous support member 10 for safety.

The principles, preferred embodiments and modes of operation of the present invention have been described in the foregoing specification. However, the invention should not be construed as limited to the particular embodiments which have been described above. Instead, the embodiments described here should be regarded as illustrative rather than restrictive.

What is claimed is:

1. A storage rack comprising a rigid support member with a circular cross section defining spaced sinuous segments and having sinuous end segments, each sinuous end segment of said rigid support member being open, a cap member mounted on each sinuous end segment of said rigid support member, a plurality of mounting assemblies mounted to said support member on said sinuous segments, each said mounting assembly comprising a hook member, a flexible linear elastic extension member secured on one end to said hook member, a mounting member secured to said flexible linear elastic extension member on an end opposite said hook member, said mounting member being mounted to said support member.

2. A storage rack as claimed in claim 1 wherein said support member is metal.

3. A storage rack as claimed in claim 1 wherein said hook member includes a spring section.

4. A storage rack as claimed in claim 1 wherein said extension member is stretchable fiber.

5. A storage rack as claimed in claim 1 wherein said mounting member is an eyelet defining an aperture greater in diameter than said support member.

6. A storage rack as claimed in claim 1 wherein said plurality of mounting assemblies is at least three mounting assemblies.

7. A storage rack as claimed in claim 1 wherein said elastic flexible linear extension member is a stretchable fiber composite.

8. A bag storage rack for a vehicle trunk comprising a rigid plastic support member having integral evenly spaced sinuous portions and open ends and a plurality of mounting assemblies mounted on said rigid support member, each mounting assembly being mounted on said rigid support member at an upper curved section of a sinuous portion, each said mounting assembly comprising a hook member, a linear flexible elastic extension member secured at one end to said hook member, a loop member secured to said flexible elastic extension member at an end opposite said hook member with said loop member being mounted around a sinuous portion of said support member.

9. A storage rack for a vehicle trunk as claimed in claim 8 wherein said support member has a circular cross section.

10. A storage rack for a vehicle trunk as claimed in claim 8 wherein said hook member includes a spring mounted opposite a hook.

11. A storage rack for a vehicle trunk as claimed in claim 8 wherein said flexible elastic extension member is rubber.

12. A storage rack as claimed in claim 8 wherein said each open end of said support member has a cap member mounted thereon.

13. A storage rack comprising a rigid support member defining spaced integral sinuous segments and open ends, said rigid support member having a uniform circular cross section, a plurality of mounting assemblies mounted to said sinuous segments, each of said mounting assemblies comprising an elastic flexible linear extension member, a hook member assembly comprising a hook member integrally connected to a coil spring, said coil spring being secured to one end of said elastic flexible linear extension member, a circular loop member defining a center aperture secured to an opposite end of said elastic flexible linear extension member, said circular loop member center aperture being mounted around a sinuous segment of said rigid support member, with said sinuous segment of said support member extending through said center aperture of said circular loop member.

* * * * *